Figure 3:
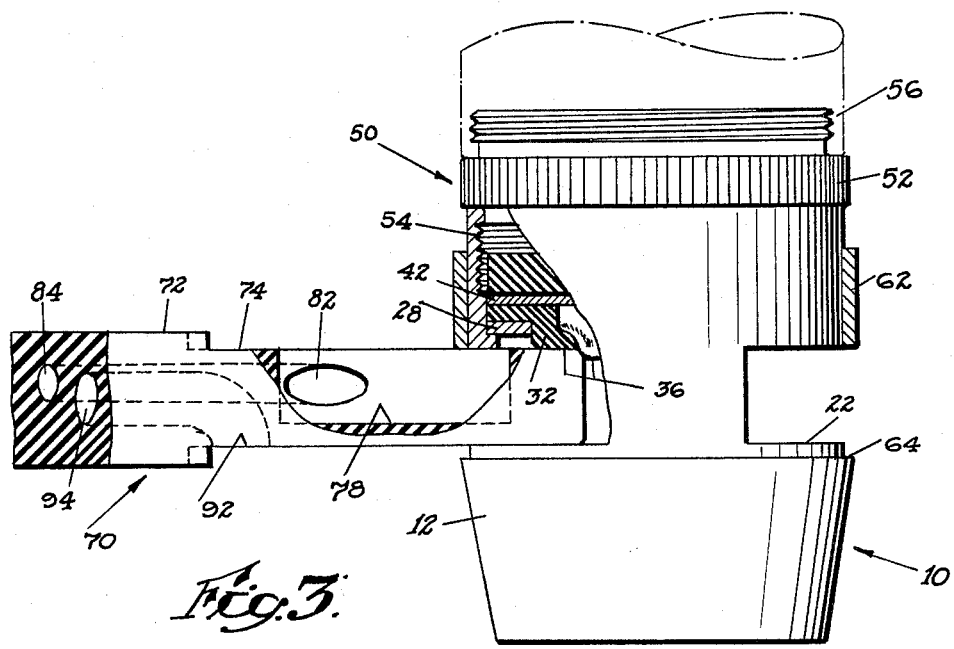

Nov. 29, 1966  W. C. LOVELL  3,288,376
QUICK-RELEASE COUPLING
Filed June 11, 1964  2 Sheets-Sheet 1
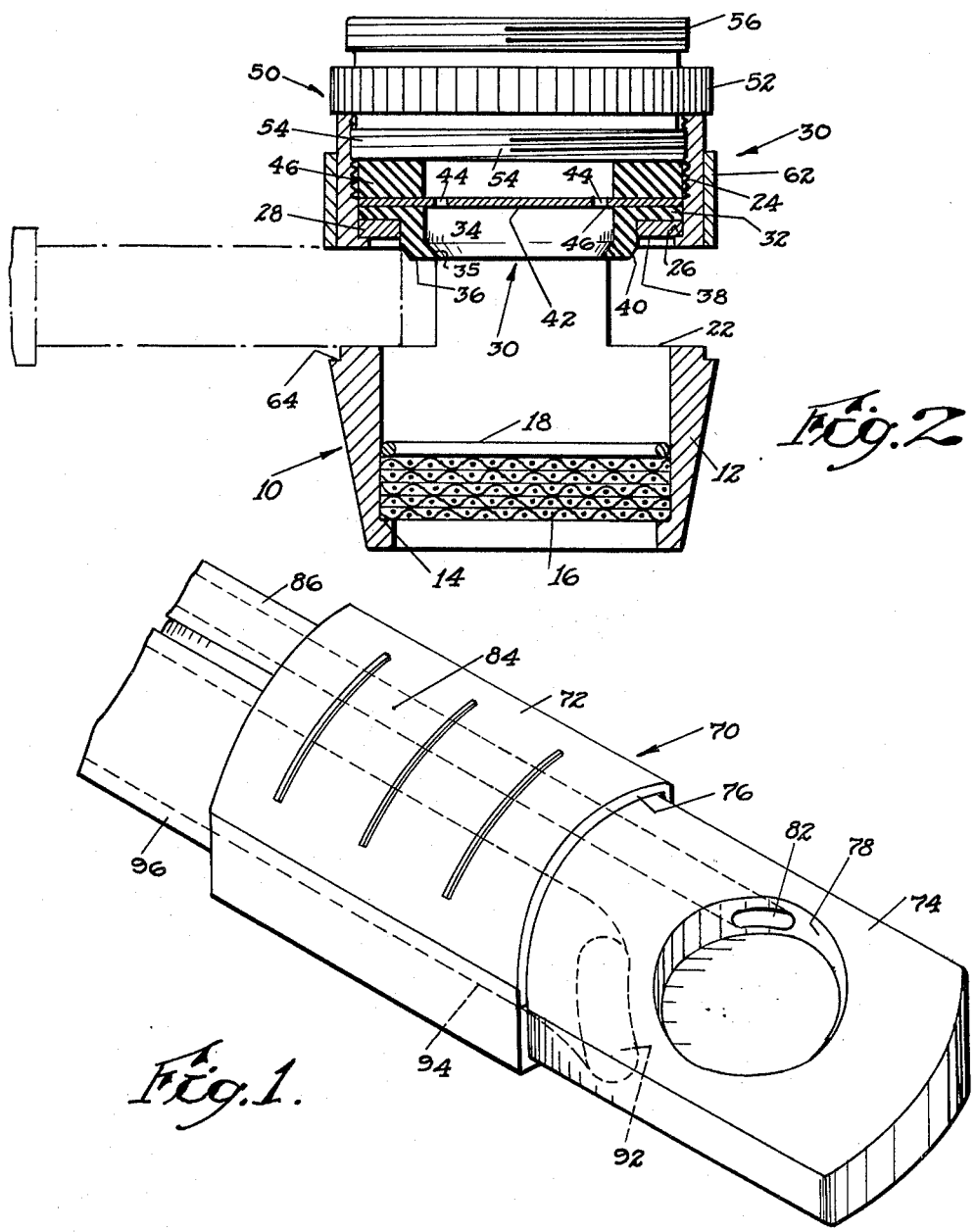
INVENTOR
WALTER C. LOVELL
BY
Lewis M. Smith, Jr.
ATTORNEY Nov. 29, 1966 W. C. LOVELL 3,288,376
QUICK-RELEASE COUPLING Filed June 11, 1964 2 Sheets-Sheet 2

INVENTOR
WALTER C. LOVELL
BY
Lewis M. Smith, Jr.
ATTORNEY

United States Patent Office 3,288,376
Patented Nov. 29, 1966

3,288,376
QUICK-RELEASE COUPLING
Walter C. Lovell, Longmeadow, Mass., assignor to
Seth R. Martin, Grafton, Mass.
Filed June 11, 1964, Ser. No. 374,503
5 Claims. (Cl. 239—428.5)

The present invention relates to a quick releasable coupling, and more particularly to a coupling consisting of a hollow first component arranged to pass fluid therethrough and also arranged to receive and support a second component effective to direct energy supplied by either a compressible or a non-compressible fluid to a location remote from the first component, said second component in the form illustrated and described herein being arranged to divert a fluid entering the first component to a remote location and thence back through the second component for discharge from the first component.

Of the large variety of power driven tools and other appliances presently available for use in the home and elsewhere, most are driven by an electric motor connected to a 110 volt or 115 volt electrical circuit for operation with generally satisfactory results. However, the use of tools or other appliances driven by such motors may prove hazardous in areas equipped with plumbing to provide a water supply, such as kitchen, laundry and bathroom areas in the home, for example.

The risk of receiving an electric shock while using a tool or other appliance in such an area can be avoided entirely by using a tool or other appliance powered by a fluid driven motor such as the one described in my copending application Serial No. 179,880 entitled "Fluid Motors," and filed on March 15, 1962, now Patent No. 3,236,157.

However, in order to be equally convenient, a tool or other appliance driven by a fluid motor must be able to be connected to or disconnected from a source of fluid as quickly and easily as an electric motor can be connected to and disconnected from an electrical circuit.

Accordingly, this invention contemplates the provision of a first receiving component which may be mounted to remain connected to a source of fluid, such as a water faucet or the like, to serve by itself as an aerator, and the provision of a cooperating second insertable component arranged to be inserted into and supported by the first component, said second component in turn being connected to and supporting a suitable means to transfer energy supplied by a fluid to a remote location, such as conduits arranged to convey a fluid to and from a remotely located fluid motor.

An object of this invention is the provision of first and second components selectively interfitted to transfer to a remote location energy supplied by fluid passing through said first component by suitable means such as an auxiliary fluid circuit starting and ending at the first component, and alternatively separated by the withdrawal of the second component from the first component to eliminate the transfer of energy to a remote location by means such as an auxiliary fluid circuit.

Another object is the provision of a generally cylindrical first component which may be fixedly secured to a fluid outlet such as a water faucet so that it forms an extension thereof.

Still another object is the provision of a generally cylindrical first component equipped to function by itself as an aerator, when the second component is withdrawn therefrom.

Yet another object is the provision of a second component with a flat blade portion having a fluid inlet on one face and a fluid outlet on the other face, both communicating with an auxiliary fluid conduit, and arranged to block the direct flow of fluid through the first component when the second component is inserted into the first component.

Figure 4:
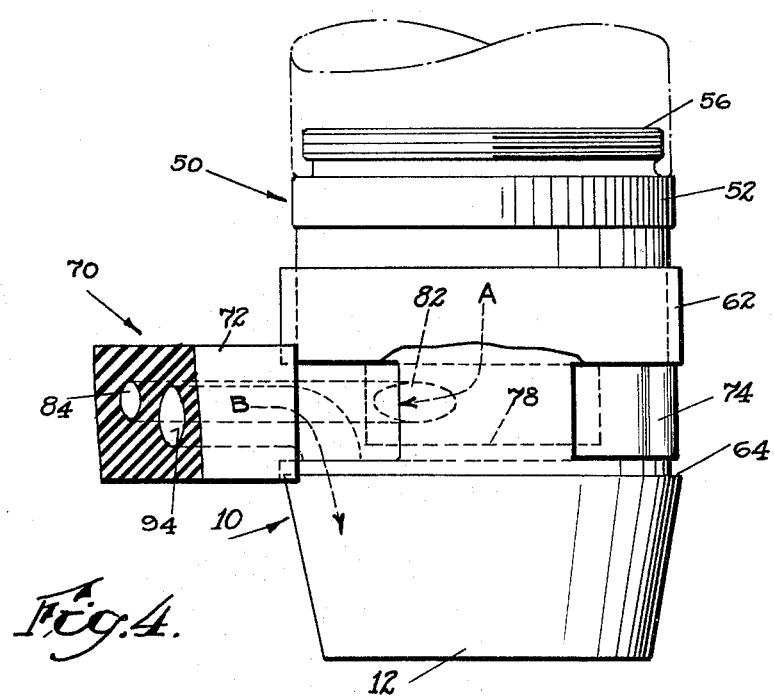

Other objects and advantages of this invention will be evident from consideration of the detailed description below in relation to the showing in the accompanying drawings, wherein:

FIG. 1 is a pictorial view of the preferred embodiment of the insertable component of the quick-releasable coupling comprising the instant invention, FIG. 2 is a vertical section through the preferred embodiment of the receiving component of the quick-releasable coupling comprising the instant invention, FIG. 3 is a side elevation, partially broken away, showing the insertable component partially engaged with the receiving component, and FIG. 4 is a side elevation, partially broken way, showing the insertable component fully engaged with the receiving component.

Referring now to the drawings, wherein like reference numerals refer to like or corresponding parts, FIG. 1 illustrates the insertable component of the instant invention comprising a dagger type insert assembly generally designated by the reference numeral 70 which includes a grip portion 72 relatively larger in cross section than an adjoining blade portion 74 so that the respective portions 72 and 74 are separated by a curved shoulder 76. The upper face of the blade portion 74 is provided with a centrally disposed circular recess 78 having an inlet opening 82 in the side wall thereof connecting with an inlet passage 84 extending through the grip portion 72 and thence with an elongated inlet conduit 86. The lower face of the blade portion 74 is provided with an outlet opening adjacent its periphery connecting with an outlet passage 94 extending through the grip portion 74 and thence with an elongated outlet conduit 96.

Considering next the showing in FIG. 2, this view illustrates the receiving component of the instant invention comprising an aerator assembly generally designated by the reference numeral 10 which includes a cylindrical barrel 12 provided adjacent its lower end with an internal shoulder 14 arranged to support a series of circular screens 16 secured within the barrel 12 by any suitable retaining means such as a spring retaining ring 18 or the like. The barrel 12 is also provided with an opposed pair of elongated slots 22 extending around predetermined portions of its periphery and relatively much wider axially of the barrel 12 than the slots provided in conventional aerators of comparable size, in order to accommodate the blade portion 74 described above. The barrel 12 is provided with internal screw threads 24 adjacent its upper end and with a second internal shoulder 26 arranged to support several elements of the aerator assembly 10.

An annular washer 28 of suitable metal or other relatively hard material, supported upon the shoulder 26, in turn supports an annular seal of resilient material such as rubber or the like, generally designated by the reference numeral 30, including an external flange portion 32 resting on the washer 28 and a dependent cylindrical portion 34 extending below the washer 28 and having a planar lower face 36 with a chamfer 38 around its outer edge and forming an inwardly extending lip 35 at the lower end of the cylindrical portion 34.

A flat circular nozzle plate 42 provided with a series of spaced orifices 44 is supported between the flange portion 32 of the seal 30 and a resilient annular seal 46 disposed adjacent the screw threads 24 as shown in FIG. 2.

The aerator assembly 10 may be mounted by suitable attachment means so that it is dependent from a water faucet or other fluid outlet as shown in FIG. 3. In the case of a faucet provided with an external screw thread at its lower end, attachment may be by engaging internal screw thread 24 of the barrel 12 directly with the external thread on the faucet. When a water faucet or other fluid outlet is provided with an internal thread, the attachment means may consist of an annular adapter assembly generally designated by the reference numeral 50 including a central portion 52 which may be provided with a knurled surface, a lower externally threaded portion 54 for engagement with screw thread 24 of the barrel 12, and an upper externally threaded portion 56 for engagement with the internal thread on the faucet or other fluid outlet.

When a faucet or other fluid outlet is neither internally not externally threaded, the aerator assembly 10 may be attached to a faucet or other fluid outlet by means of one of several clamping means for this purpose which are commercially available.

Since the receiving component of the instant invention may replace an aerator assembly when it is installed on a water faucet, it is preferably constructed as shown in FIG. 2 so that it will function by itself as an aerator. However, the nozzle plate 42 can be omitted from the barrel 12 for applications in which the receiving component is not required to function as an aerator.

In operation, the first receiving component fixedly secured to a water faucet or the like functions as an aerator whenever water is discharged from the faucet, except when the second insertable component is advanced radially of the barrel 12 into full engagement with the aerator assembly 10 comprising the receiving component. In order to effect this full engagement, the blade portion 74 of the dagger type insert assembly 70, shown best in FIG. 1, is passed through the peripheral slots 22 in the barrel 12 of the aerator assembly 10, starting as indicated in FIG. 2 by the phantom representation of the end of blade portion 74, continuing with the upper face of the blade portion 74 bearing against the dependent cylindrical portion 34 of the seal 30 as shown in FIG. 2, and finally reaching the position shown in FIG. 4 with the shoulder 76 engaging the outer surface of the barrel 12.

With the blade portion 74 of the dagger type insert assembly 70 positioned within the barrel 12 of the aerator assembly 10 as shown in FIG. 4, water or other fluid admitted to the upper end of the barrel 12 from a faucet or the like is prevented from passing directly through the barrel 12 by the presence of the blade portion 74 and from escaping through the peripheral slots 22 by the engagement of the lower face 36 of the seal 30 with the upper face of the blade portion 74. Consequently, the water or other fluid enters the inlet opening 82 as indicated by the arrow A in FIG. 4 and passes through inlet conduit 86 for the desired application at a remote location, such as the operation of a fluid driven motor.

The pressure exerted by a fluid passing through the aerator assembly 10 acts against the upper surface of the lip 35 to press the lip 35 against the upper surface of the blade portion 74 adjacent the periphery of the central recess 78, thus improving the sealing engagement between the annular seal 30 and the blade portion 74 of the insert assembly 70.

Since the discharge of water or other fluid at a remote location may not be desirable, the effluent from a fluid driven motor or other fluid activated device at a remote location is returned through the outlet conduit 96 and thence through the outlet opening 92 in the lower face of the blade portion 74 as indicated by arrow B in FIG. 4 for discharge through the lower end of the barrel 12.

While the features of the insert assembly 70 described and illustrated herein constitute one suitable arrangement for transferring energy supplied by a fluid to a location remote from the aerator assembly 10, it should be understood that various other means suitable for this purpose may be incorporated in an insert assembly 70 with a blade portion shaped to pass through the opposed slots 22 of an aerator assembly 10. Accordingly, a single aerator assembly 10 may selectively accommodate one of several different insert assemblies 70 associated with different appliances.

The peripheral slots 22 may be shielded across most of their width axially of the barrel 12 by a slightly narrower shroud ring mounted to slide along the outer surface of the barrel 12 and to rest on the external shoulder 64. The shroud ring 62 is lifted clear of the peripheral slots 22 to admit the blade portion 74 of the insert assembly 70, and it drops into engagement with the shoulder 64 when the blade portion 74 is withdrawn from the slots 22, leaving narrow portions adjacent the upper edges of the slots 22 exposed to admit the air required for aeration of the fluid passing through the barrel 12 of the aerator assembly 10.

Thus, this invention provides a quick-releasable coupling comprising first and second selectively interconnected components together effective to divert a fluid passing the first component to a remote location and back to the first component through the second interfitted component and fluid conduits connected to the second component. In addition, this invention provides a first component arranged to perform the useful function of an aerator whenever a liquid such as water or the like is passed through the first component while the second component is disengaged from the first component.

The description provided herein and the showing in the accompanying drawings are to be considered as illustrative of this invention rather than in a limiting sense, since various modifications of this device may be made within the scope of the appended claims.

What is claimed is:

1. A quick-releasable coupling comprising a first component including an elongated tubular body mounted to receive a fluid at one end thereof and to discharge a fluid at the other end thereof, said tubular body being provided midway of its length with opposed slots along predetermined portions of its periphery, and a second component including a flat blade portion selectively inserted through the opposed slots in the tubular body to block the direct flow of fluid through the tubular body, said blade portion being provided on one face with an inlet opening connected to an inlet conduit and on the other face with an outlet opening connected to an outlet conduit, so that when said second component is engaged with said first component a fluid received in said tubular body is diverted to a remote location and then returned to said tubular body for discharge.

2. A quick-releasable coupling as described in claim 1, wherein a resilient sealing means supported by said tubular body sealably engages said blade portion around the inlet opening therein when said second component is fully engaged with said first component.

3. A quick-releasable coupling as described in claim 1, wherein a nozzle means is supported in said tubular body between the slots and the end of the tubular body at which a fluid is received, so that said first component functions by itself as an aerator when said second component is disengaged therefrom.

4. A quick-releasable coupling comprising a first component including an elongated tubular body arranged to be mounted dependent from a fluid outlet, to receive a fluid at the upper end thereof and to discharge a fluid at the lower end thereof, said tubular body being provided midway between its upper and lower ends with opposed slots through predetermined opposite sectors of its periphery and supporting an annular resilient sealing means above the slots so that a cylindrical portion thereof extends downwardly into the space between the slots, and a second component including a flat blade portion selectively inserted through the opposed slots in the tubular body to block the direct flow of fluid downwardly through the tubular body and to deflect the cylindrical portion of the resilient sealing means so that the cylindrical portion of the resilient sealing means is biased against the upper face of said blade portion, said blade portion having an inlet opening located centrally of its upper face connected through said second component to an inlet conduit supported by said second component and having an outlet opening in its lower face connected through said second component with an outlet conduit supported by said second component, so that when said second component is fully engaged with said first component a fluid admitted through the upper end of said first component is diverted through the inlet opening and the inlet conduit to a remote location and thence through the outlet conduit and the outlet opening for discharge through the lower end of said first component.

5. A quick-releasable coupling as described in claim 4 wherein said first component additionally includes a nozzle means supported by said tubular body between the slots and the upper end of said tubular body, so that said first component functions by itself as an aerator when said second component is disengaged therefrom.

References Cited by the Examiner

UNITED STATES PATENTS

| | | | |
|---|---|---|---|
| 2,664,278 | 12/1953 | Aghnides | 239—428.5 |
| 3,030,029 | 4/1962 | Slater | 239—25 |
| 3,062,452 | 11/1962 | Knight | 239—25 |
| 3,108,748 | 10/1963 | Kiore | 239—25 |
| 3,138,332 | 6/1964 | Hinderer | 239—428.5 |

EVERETT W. KIRBY, *Primary Examiner.*